United States Patent
Foronda, Jr.

(10) Patent No.: US 6,902,666 B1
(45) Date of Patent: Jun. 7, 2005

(54) AQUARIUM FILTER

(76) Inventor: Gregorio C. Foronda, Jr., 3875 Millbrae Terr, Perris, CA (US) 92571

( * ) Notice: Subject to any disclaimer, the term of this patent is extended or adjusted under 35 U.S.C. 154(b) by 0 days.

(21) Appl. No.: 10/638,188

(22) Filed: Aug. 8, 2003

(51) Int. Cl.[7] .......................... A01K 63/04; B01D 35/02
(52) U.S. Cl. ...................... 210/169; 210/232; 210/266; 210/416.2; 210/446; 210/460; 210/903
(58) Field of Search ................................ 210/169, 232, 210/263, 266, 282, 287, 416.1, 446, 416.2, 449, 459, 460, 488, 489, 903

(56) References Cited

U.S. PATENT DOCUMENTS

| | | | |
|---|---|---|---|
| 2,199,258 A | * 4/1940 | Gray | 210/283 |
| 3,300,050 A | * 1/1967 | Perry | 210/234 |
| 3,522,882 A | * 8/1970 | Dykes | 210/198.1 |
| 3,815,752 A | * 6/1974 | Hoffman et al. | 210/266 |
| 3,841,490 A | * 10/1974 | Hoffman et al. | 210/266 |
| 4,259,302 A | 3/1981 | Katz et al. | |
| 4,601,712 A | * 7/1986 | Cole et al. | 604/251 |
| 5,008,011 A | * 4/1991 | Underwood | 210/232 |
| 5,110,330 A | * 5/1992 | Loughran | 96/117.5 |
| 5,234,581 A | * 8/1993 | Rosenberg | 210/151 |
| 5,433,843 A | * 7/1995 | Calabrese | 210/138 |
| 5,503,742 A | * 4/1996 | Farley | 210/238 |
| 5,882,515 A | * 3/1999 | Lacy et al. | 210/232 |
| 5,939,086 A | 8/1999 | Levy | |
| 5,972,213 A | * 10/1999 | Golan | 210/186 |
| 6,025,152 A | 2/2000 | Hiatt | |

* cited by examiner

Primary Examiner—Fred G. Prince

(57) ABSTRACT

A aquarium filter for filtering water being introduced into an aquarium. The aquarium filter includes a body member comprising a perimeter wall. The perimeter wall defines a bore extending through the body member. The body member is designed for being coupled to a hose whereby the bore of the body member is for permitting water from the hose to pass through the body member. A filtering material is positioned in the bore of the body member. The filtering material is designed for contacting the water whereby the filtering material is for filtering contaminants and chemicals from the water when the water passes through the body member. A tip member is coupled to the body member. The tip member is positioned opposite the hose whereby the tip member is designed for reducing air bubbles in the water.

11 Claims, 2 Drawing Sheets

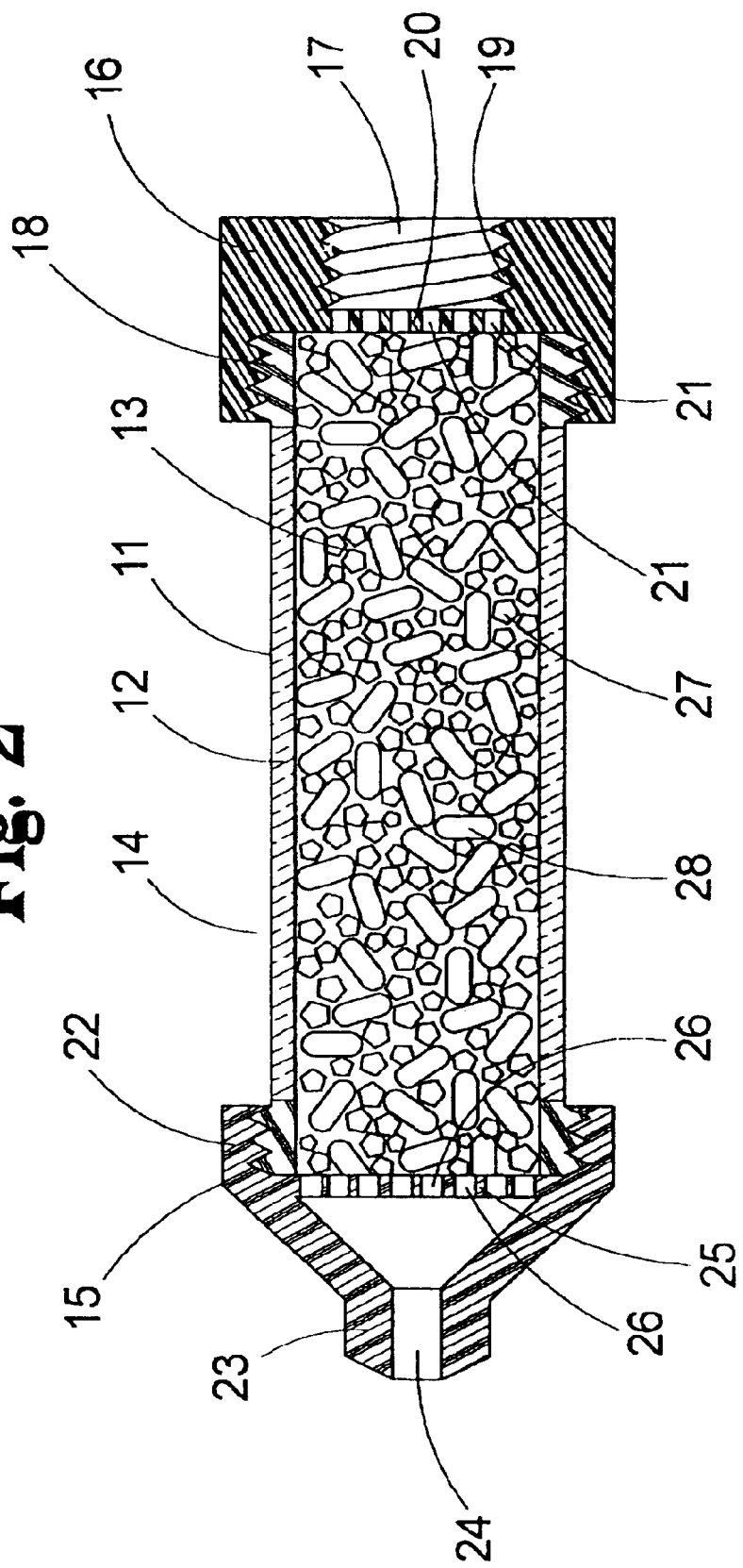

AQUARIUM FILTER

BACKGROUND OF THE INVENTION

1. Field of the Invention

The present invention relates to filtering compositions and more particularly pertains to a new aquarium filter for filtering water being introduced into an aquarium.

2. Description of the Prior Art

The use of filtering compositions is known in the prior art. U.S. Pat. No. 6,025,152 describes a mixture for denitrifying aerobic bacterial compositions. Another type of filtering composition is U.S. Pat. No. 5,939,086 having a composition for reducing contaminants in aquatic and terrestrial environments. U.S. Pat. No. 4,259,302 has a scrubber for scrubbing ammonia gas from a gas stream.

SUMMARY OF THE INVENTION

Still yet another object of the present invention is to provide a new aquarium filter that strains contaminants from the water before the water contact the filtering material to provide greater surface area between the water and the filter material to insure maximum filtration of the water by the filter material.

Even still another object of the present invention is to provide a new aquarium filter that is capable of being coupled to a tube to allow water to run through the filter material is both directions.

To this end, the present invention generally comprises a body member comprising a perimeter wall. The perimeter wall defines a bore extending through the body member. The body member is designed for being coupled to a hose whereby the bore of the body member is for permitting water from the hose to pass through the body member. A filtering material is positioned in the bore of the body member. The filtering material is designed for contacting the water whereby the filtering material is for filtering contaminants and chemicals from the water when the water passes through the body member. A tip member is coupled to the body member. The tip member is positioned opposite the hose whereby the tip member is designed for reducing air bubbles in the water.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than hose set forth above will become apparent when consideration is given to the following detailed description thereof. Such description makes reference to the annexed drawings wherein:

FIG. 2 is a cross-sectional view of the present invention taken along line 2—2 of FIG. 1.

DESCRIPTION OF THE PREFERRED EMBODIMENT

Figure 1:
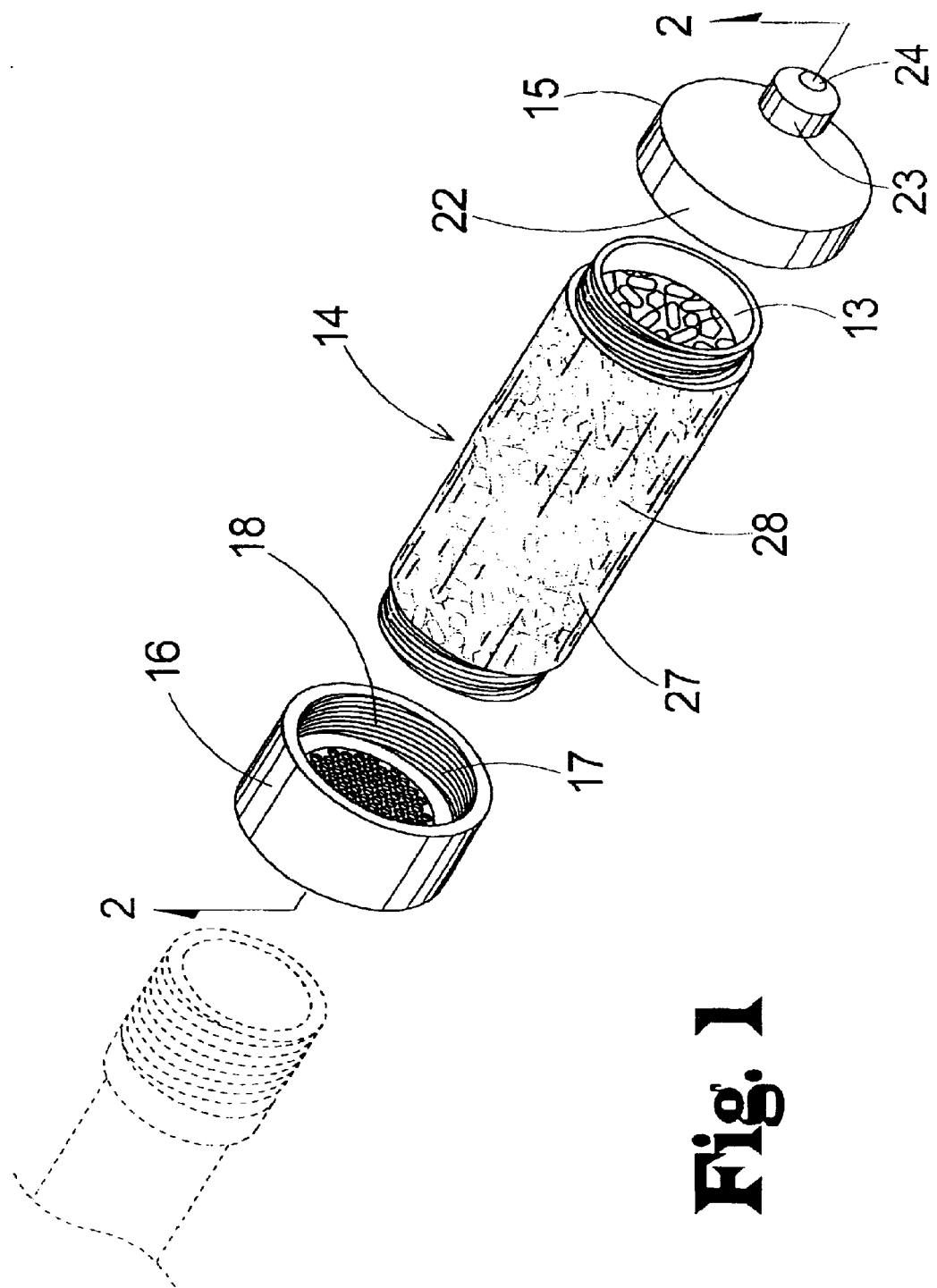
FIG. 1 is an exploded perspective view of a new aquarium filter according to the present invention.

With reference now to the drawings, and in particular to FIGS. 1 through 2 thereof, a new aquarium filter embodying the principles and concepts of the present invention and generally designated by the reference numeral 10 will be described.

As best illustrated in FIGS. 1 through 2, the aquarium filter 10 generally comprises a body member 11 comprising a perimeter wall 12. The perimeter wall 12 defines a bore 13 extending through the body member 11. The body member 11 is designed for being coupled to a hose whereby the bore 13 of the body member 11 is for permitting water from the hose to pass through the body member 11. The body member 11 has a length of about 10 inches and diameter of about 2 inches.

A filtering material 14 is positioned in the bore 13 of the body member 11. The filtering material 14 is designed for contacting the water whereby the filtering material 14 is for filtering contaminants and chemicals from the water when the water passes through the body member 11. The filtering material 14 comprises a mixture of phosphate free activated carbon members 27 and ammonia absorbing pellets 28. The phosphate free activated carbon members 27 are designed for absorbing harmful chemicals in the water to remove the harmful chemicals from the water to provide a better habitat for the fish. The ammonia absorbing pellets 28 are designed for absorbing ammonia from the water to inhibit fish in the aquarium from contacting the ammonia. The filtering material 14 reduces the amount of bubbles in the water the is ejected from the body member 11.

A tip member 15 is coupled to the body member 11. The tip member 15 is positioned opposite the hose whereby the tip member 15 is designed for reducing air bubbles in the water. The tip member 15 has a length of about 3 inches.

A sleeve member 16 comprises a lumen 17. The sleeve member 16 is selectively coupled to the body member 11 whereby the sleeve member 16 is positioned opposite the tip member 15. The sleeve member 16 is designed for being selectively coupled between the body member 11 and the hose whereby the lumen 17 of the sleeve member 16 is for permitting fluid communication between the hose to the body member 11. The sleeve member 16 has a length of about 3 inches.

The lumen 17 of the sleeve member 16 comprises a first threaded portion 18. The first threaded portion 18 threadably engages the body member 11 whereby the first threaded portion 18 is for selectively coupling the sleeve member 16 to the body member 11.

The lumen 17 of the sleeve member 16 comprises a second threaded portion 19. The second threaded portion 19 is positioned opposite the first threaded portion 18. The second threaded portion 19 is designed for threadably engaging the hose whereby the second threaded portion 19 is for selectively coupling the sleeve member 16 to the hose.

The sleeve member 16 comprises a strainer portion 20. The strainer portion 20 is positioned in the lumen 17 of the sleeve member 16. The sleeve member 16 is designed for being positioned between the body member 11 and the hose whereby the strainer portion 20 is designed for straining contaminants from the water passing into the body member 11.

The strainer portion 20 of the sleeve member 16 comprises a plurality of strainer apertures 21. Each of the strainer apertures 21 extends through the strainer portion 20 whereby the strainer apertures 21 are designed for permitting water from the hose to pass through the strainer portion 20 and into the body member 11 and for preventing the filtering material 14 from exiting the body member 11.

The tip member 15 comprises a collar portion 22 and a nozzle portion 23. The collar portion 22 threadably engages the body member 11 whereby the collar portion 22 permits fluid communication between the nozzle portion 23 of the tip member 15 and the body member 11. The nozzle portion 23 is designed for spraying water into the aquarium when water is delivered through the body member 11. The nozzle portion 23 has diameter of about 5/8 of an inch. The collar portion 22 has a length of about 1¾ inches with the nozzle portion 23 having a length of about 1¼ inches.

The nozzle portion 23 of the tip member 15 comprises a nozzle aperture 24. The nozzle aperture 24 extends through the nozzle portion 23 of the tip member 15. The nozzle aperture 24 is in fluid communication with the body member 11 whereby the nozzle aperture 24 is designed for spraying water exiting from the body member 11 into the aquarium.

The nozzle portion 23 of the tip member 15 comprises a diameter. The diameter of the nozzle portion 23 is designed for permitting the nozzle portion 23 to be selectively inserted to a tube whereby the nozzle portion 23 is for permitting water to be introduced into the body member 11 to be filtered when the body member 11 is removed from the hose or the user does not have a hose of the proper size to fit the sleeve member 16. The diameter of the nozzle portion 23 is about 5/8 of an inch to permit insertion into most standard aquarium tubing.

The tip member 15 comprises a sifting portion 25. The sifting portion 25 positioned between the nozzle portion 23 and the collar portion 22. The sifting portion 25 is designed for sifting contaminants and loose filtering material 14 from the water passing between the nozzle portion 23 of the tip member 15 and the body member 11.

The sifting portion 25 of the tip member 15 comprises a plurality of sifting apertures 26. Each of the sifting apertures 26 extending through the sifting portion 25 whereby the sifting apertures 26 are designed for permitting water to pass between the nozzle portion 23 of the tip member 15 and the body member 11 and for preventing the filtering material 14 from exiting the body member 11.

In use, the user couples the tip member 15 to the body member 11. The filer material is then introduced into the bore 13 of said body member 11 and the sleeve member 16 coupled to the body member 11 to retain the filter material in the bore 13 of the body member 11. The sleeve member 16 is then coupled to the hose. The faucet is turned on with the body member 11 positioned in the sink to rinse any dust and loose material on the filter mixture into the drain. The water is turned off and the body member 11 is introduced into the aquarium and the water is turned on to fill the aquarium with water that had been filtered to provide clean water for the fish in the aquarium. Alternately, the user may insert the nozzle portion 23 may be inserted into aquarium tubing and the water introduced into the body member 11 to be filtered when the user does not have a hose capable of the being used with the sleeve member 16.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An aquarium filter for filtering water during filling of an aquarium, the aquarium filter comprising:

a body member comprising a perimeter wall, said perimeter wall defining a bore extending through said body member, said body member being adapted for being coupled to a hose such that said bore of said body member is for permitting water from the hose to pass through said body member;

a filtering material being positioned in said bore of said body member, said filtering material being adapted for contacting the water such that said filtering material is for filtering contaminants and chemicals from the water when the water passes through the body member;

a tip member being coupled to said body member, said tip member being positioned opposite the hose;

said tip member comprising a collar portion and a nozzle portion, said collar portion threadably engaging said body member such that said collar portion permits fluid communication between said nozzle portion of said tip member and said body member, said nozzle portion being adapted for directing water into the aquarium when water is delivered through said body member; and said tip member comprising a sifting portion, said sifting portion positioned between said nozzle portion and said collar portion, said sifting portion being adapted for sifting contaminants from the water passing between said nozzle portion of said tip member and said body member.

2. The aquarium filter as set forth in claim 1, further comprising:

a sleeve member comprising a lumen, said sleeve member being selectively coupled to said body member such that said sleeve member is positioned opposite said tip member, said sleeve member being adapted for being selectively coupled between said body member and the hose such that said lumen of said sleeve member is for permitting fluid communication between the hose to said body member.

3. The aquarium filter as set forth in claim 2, further comprising:

said lumen of said sleeve member comprising a first threaded portion, said first threaded portion threadably engaging said body member such that said first threaded portion is for selectively coupling said sleeve member to said body member.

4. The aquarium filter as set forth in claim 3, further comprising:

said lumen of said sleeve member comprising a second threaded portion, said second threaded portion being positioned opposite said first threaded portion, said second threaded portion being adapted for threadably engaging the hose such that said second threaded portion is for selectively coupling said sleeve member to the hose.

5. The aquarium filter as set forth in claim 2, further comprising:

said sleeve member comprising a strainer portion, said strainer portion being positioned in said lumen of said sleeve member, said sleeve member being adapted for being positioned between said body member and the hose such that said strainer portion is adapted for straining contaminants from the water passing into said body member.

6. The aquarium filter as set forth in claim 5, further comprising:
said strainer portion of said sleeve member comprising a plurality of strainer apertures, each of said strainer apertures extending through said strainer portion such that said strainer apertures are adapted for permitting water from the hose to pass through said strainer portion and into said body member.

7. The aquarium filter as set forth in claim 1, further comprising:
said nozzle portion of said tip member comprising a nozzle aperture, said nozzle aperture extending through said nozzle portion of said tip member, said nozzle aperture being in fluid communication with said body member such that said nozzle aperture is adapted for directing water exiting from said body member into the aquarium.

8. The aquarium filter as set forth in claim 1, further comprising:
said nozzle portion of said tip member comprising a diameter, said diameter of said nozzle portion being adapted for permitting said nozzle portion to be selectively inserted to a tube such that said nozzle portion is for permitting water to be introduced into said body member to be filtered when said body member is removed from the hose.

9. The aquarium filter as set forth in claim 1, further comprising:
said sifting portion of said tip member comprising a plurality of sifting apertures, each of said sifting apertures extending through said sifting portion such that said sifting apertures are adapted for permitting water to pass between said nozzle portion of said tip member and said body member.

10. The aquarium filter as set forth in claim 1, further comprising:
said filtering material comprising a mixture of phosphate free activated carbon members and ammonia absorbing pellets, said phosphate free activated carbon members being adapted for absorbing chemicals and bacteria in the water to remove the chemicals and bacteria from the water, said ammonia absorbing pellets being adapted for absorbing ammonia from the water to inhibit fish in the aquarium from contacting the ammonia.

11. An aquarium filter for filtering water during filling of an aquarium, the aquarium filter comprising:
a body member comprising a perimeter wall, said perimeter wall defining a bore extending through said body member, said body member being adapted for being coupled to a hose such that said bore of said body member is for permitting water from the hose to pass through said body member;
a filtering material being positioned in said bore of said body member, said filtering material being adapted for contacting the water such that said filtering material is for filtering contaminants and chemicals from the water when the water passes through the body member;
a tip member being coupled to said body member, said tip member being positioned opposite the hose;
a sleeve member comprising a lumen, said sleeve member being selectively coupled to said body member such that said sleeve member is positioned opposite said tip member, said sleeve member being adapted for being selectively coupled between said body member and the hose such that said lumen of said sleeve member is for permitting fluid communication between the hose to said body member;
said lumen of said sleeve member comprising a first threaded portion, said first threaded portion threadably engaging said body member such that said first threaded portion is for selectively coupling said sleeve member to said body member;
said lumen of said sleeve member comprising a second threaded portion, said second threaded portion being positioned opposite said first threaded portion, said second threaded portion being adapted for threadably engaging the hose such that said second threaded portion is for selectively coupling said sleeve member to the hose;
said sleeve member comprising a strainer portion, said strainer portion being positioned in said lumen of said sleeve member, said sleeve member being adapted for being positioned between said body member and the hose such that said strainer portion is adapted for straining contaminants from the water passing into said body member;
said strainer portion of said sleeve member comprising a plurality of strainer apertures, each of said strainer apertures extending through said strainer portion such that said strainer apertures are adapted for permitting water from the hose to pass through said strainer portion and into said body member;
said tip member comprising a collar portion and a nozzle portion, said collar portion threadably engaging said body member such that said collar portion permits fluid communication between said nozzle portion of said tip member and said body member, said nozzle portion being adapted for directing water into the aquarium when water is delivered through said body member;
said nozzle portion of said tip member comprising a nozzle aperture, said nozzle aperture extending through said nozzle portion of said tip member, said nozzle aperture being in fluid communication with said body member such that said nozzle aperture is adapted for directing water exiting from said body member into the aquarium;
said nozzle portion of said tip member comprising a diameter, said diameter of said nozzle portion being adapted for permitting said nozzle portion to be selectively inserted to a tube such that said nozzle portion is for permitting water to be introduced into said body member to be filtered when said body member is removed from the hose;
said tip member comprising a sifting portion, said sifting portion positioned between said nozzle portion and said collar portion, said sifting portion being adapted for sifting contaminants from the water passing between said nozzle portion of said tip member and said body member;
said sifting portion of said tip member comprising a plurality of sifting apertures, each of said sifting apertures extending through said sifting portion such that said sifting apertures are adapted for permitting water to pass between said nozzle portion of said tip member and said body member; and
said filtering material comprising a mixture of phosphate free activated carbon members and ammonia absorbing pellets, said phosphate free activated carbon members being adapted for absorbing chemicals and bacteria in the water to remove the chemicals and bacteria from the water, said ammonia absorbing pellets being adapted for absorbing ammonia from the water to inhibit fish in the aquarium from contacting the ammonia.

* * * * *